United States Patent
Molitor et al.

(10) Patent No.: US 7,694,592 B2
(45) Date of Patent: Apr. 13, 2010

(54) ELECTRONIC METERING APPARATUS FOR METERING LIQUIDS

(75) Inventors: Peter Molitor, Henstedt-Ulzburg (DE); Karl-Friedrich Andres, Bargteheide (DE); Peter Schmidt, Lubeck (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 11/758,361

(22) Filed: Jun. 5, 2007

(65) Prior Publication Data

US 2008/0011042 A1     Jan. 17, 2008

(30) Foreign Application Priority Data

Jul. 14, 2006    (DE) .................. 10 2006 032 859

(51) Int. Cl.
*G01N 1/14* (2006.01)
(52) U.S. Cl. ................................... 73/864.18
(58) Field of Classification Search ............. 73/863.32, 73/864.01, 864.18; 422/922; 436/43
See application file for complete search history.

(56) References Cited

U.S. PATENT DOCUMENTS

| 4,821,586 | A | 4/1989 | Scordato et al. ......... 73/864.18 |
| 7,396,512 | B2 * | 7/2008 | DiTrolio et al. ............ 422/100 |
| 2002/0005075 | A1 * | 1/2002 | Kriz et al. ................ 73/864.18 |
| 2004/0171171 | A1 * | 9/2004 | Appoldt et al. ............. 436/180 |
| 2005/0118069 | A1 * | 6/2005 | Solotareff et al. ........... 422/100 |

FOREIGN PATENT DOCUMENTS

| EP | 0 864 364 A2 | 3/1998 |
| WO | 00/51738 | 9/2000 |
| WO | 2005/051543 A1 | 6/2005 |
| WO | 2005/052781 A2 | 6/2005 |
| WO | 2005/079988 A1 | 9/2005 |

\* cited by examiner

*Primary Examiner*—Daniel S Larkin
*Assistant Examiner*—Tamiko D Bellamy
(74) *Attorney, Agent, or Firm*—Vidas, Arrett & Steinkraus, P.A.

(57) ABSTRACT

An electronic metering apparatus for metering liquids with a drive, at least one displacer device with a displacer chamber and a displacer element arranged therein, which is connected to the drive, at least one holding device for a pipette point, which has a passage channel which is connected with the displacer chamber, a data memory with memory locations for different calibration data concerning different pipette points and/or different liquids and/or different usage conditions, an electric selection device for selecting calibration data, an electric control unit, which is connected to the electric selection device, the data memory, and to the electric drive motor of the drive and/or an electric display device, and which controls the movement of the displacer element by means of the electric motor and/or the display of the metering volume through the display device with recourse to the calibration data from the data memory, selected with the aid of the selection device, and an electric power supply.

17 Claims, 11 Drawing Sheets

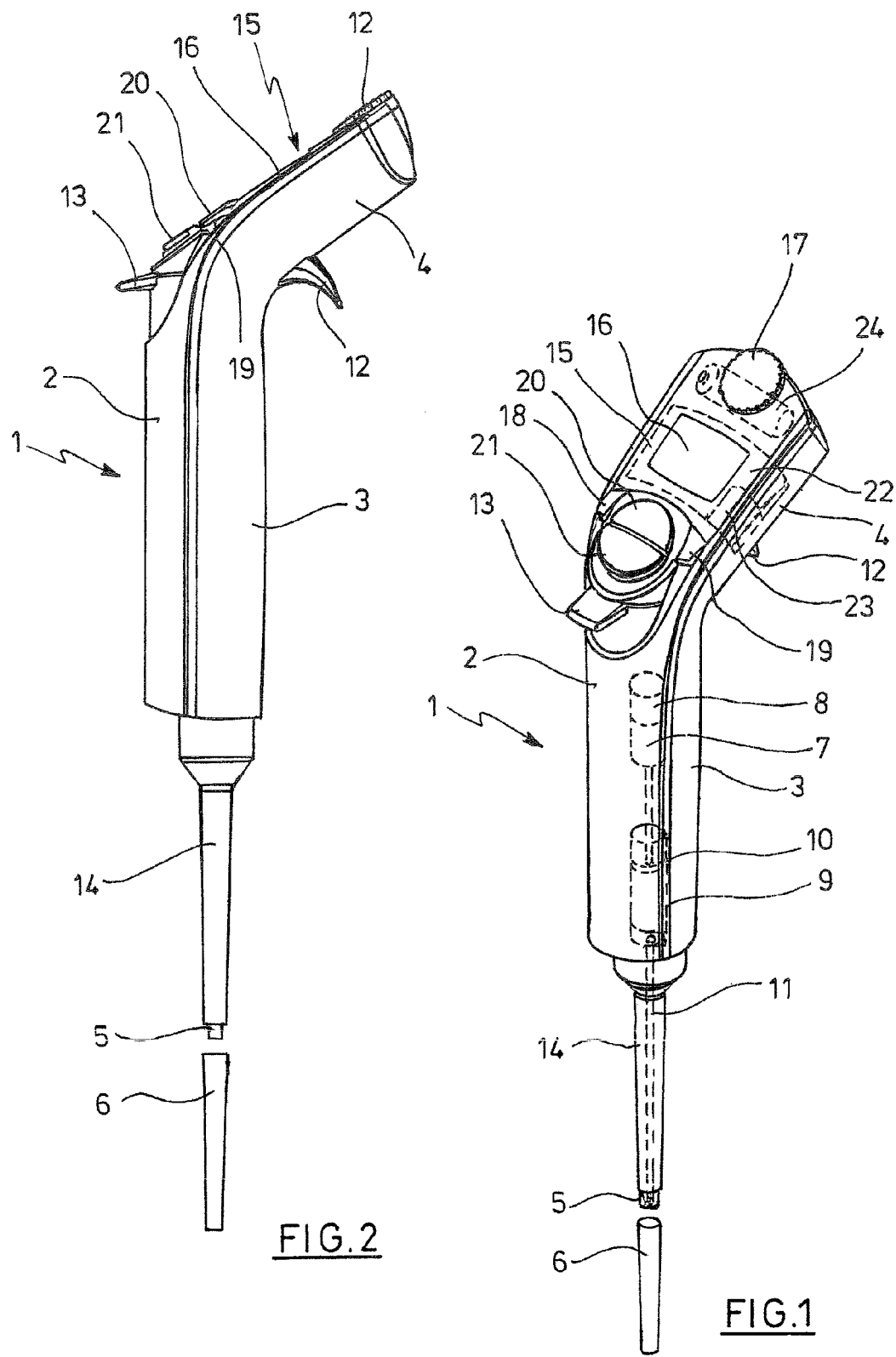

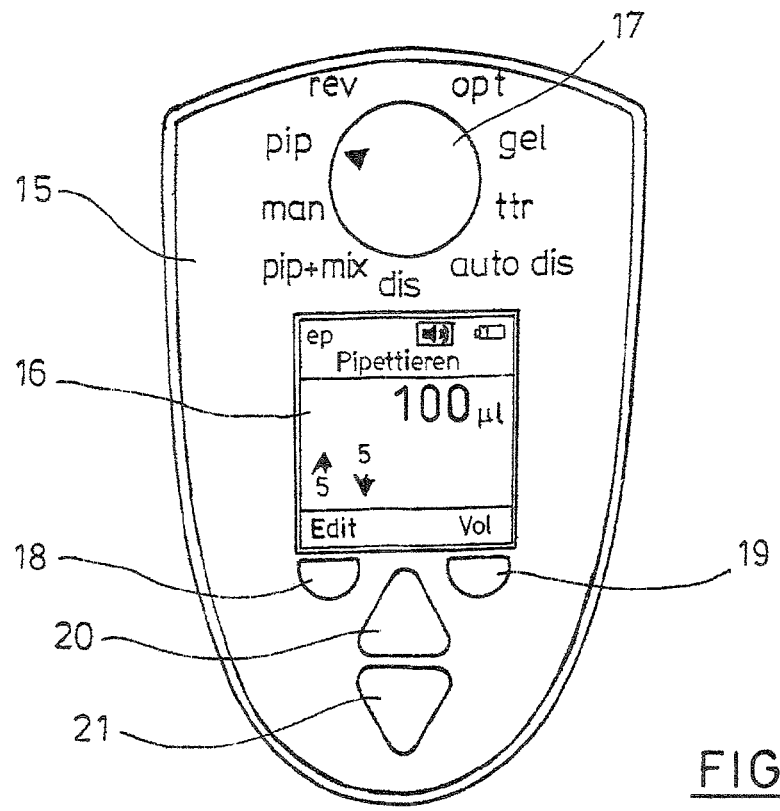
FIG.4.1
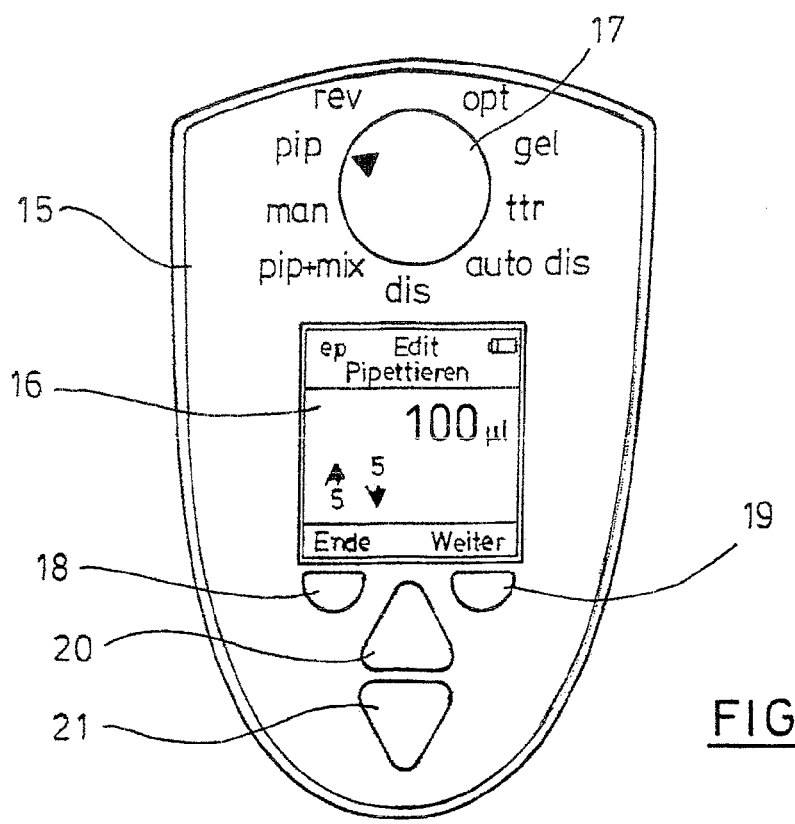
FIG.4.2

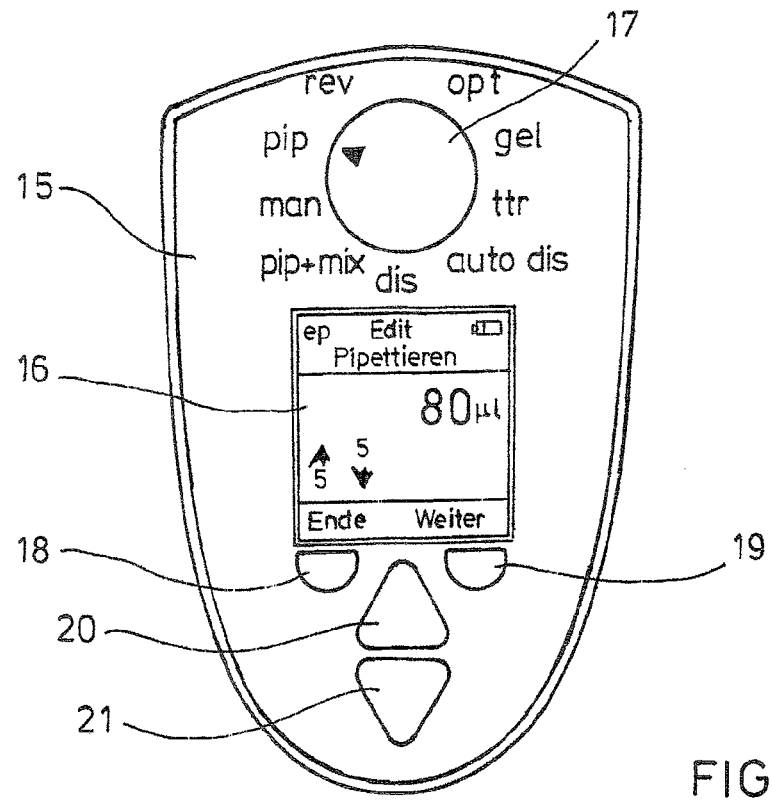
FIG.4.3
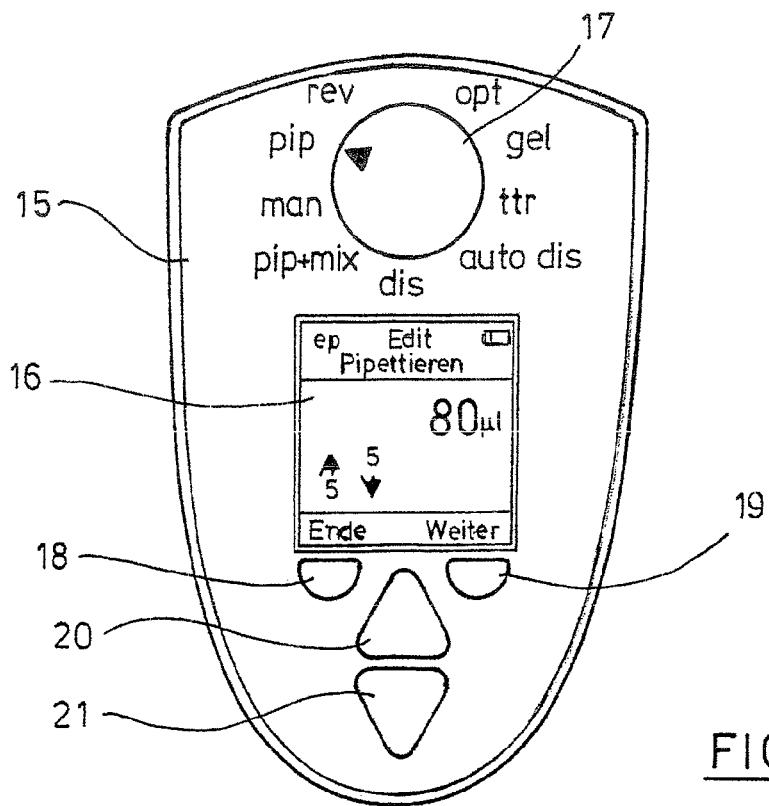
FIG.4.4

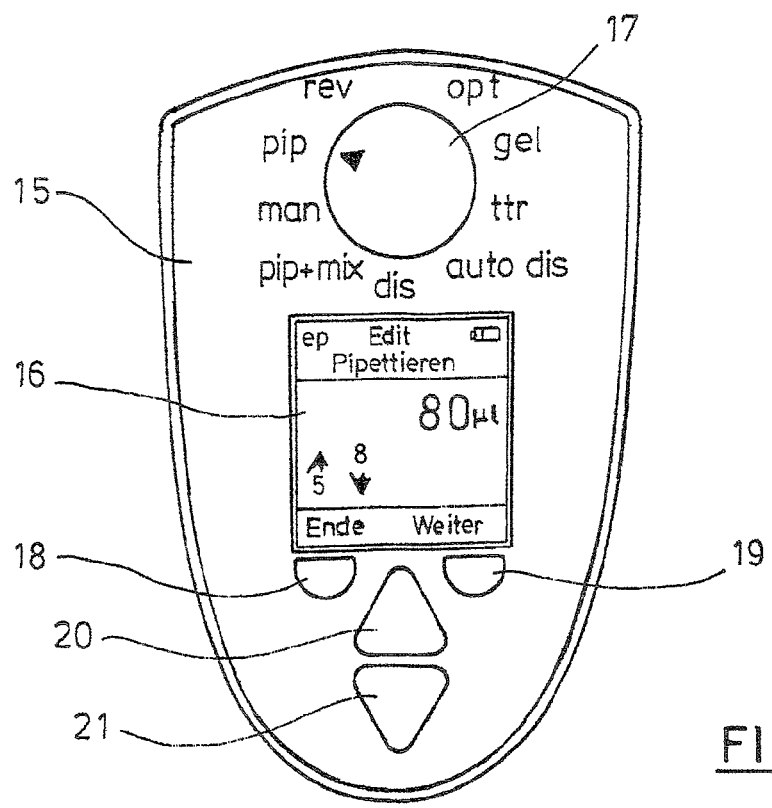
FIG.4.5
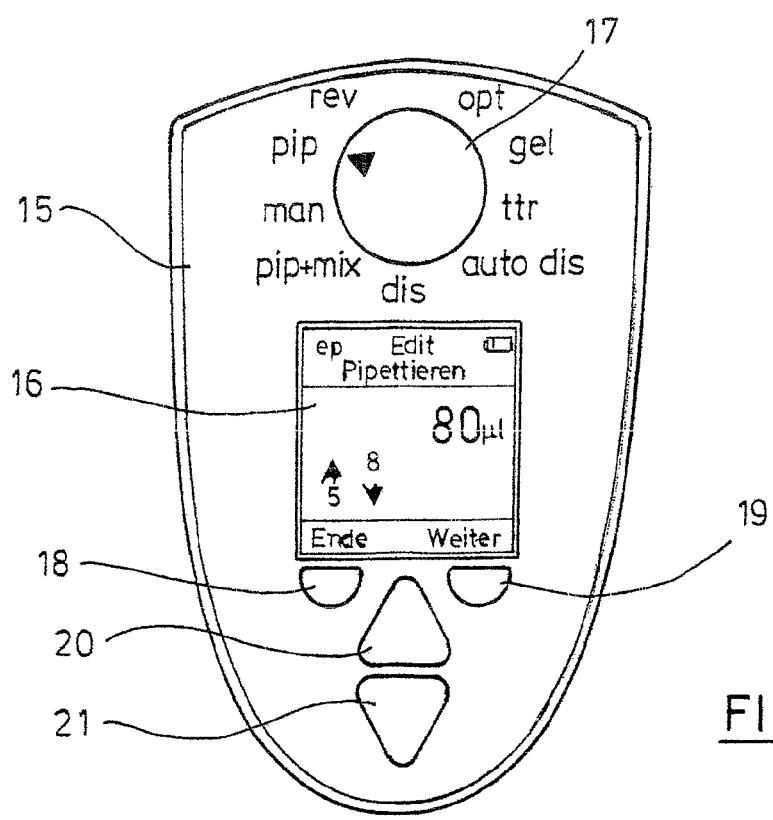
FIG.4.6

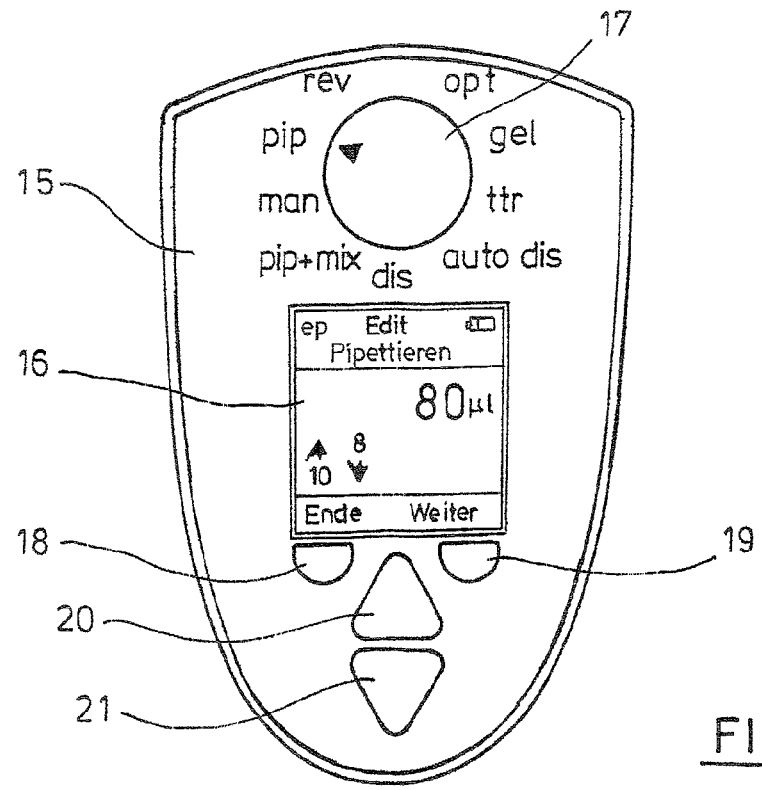
FIG.4.7
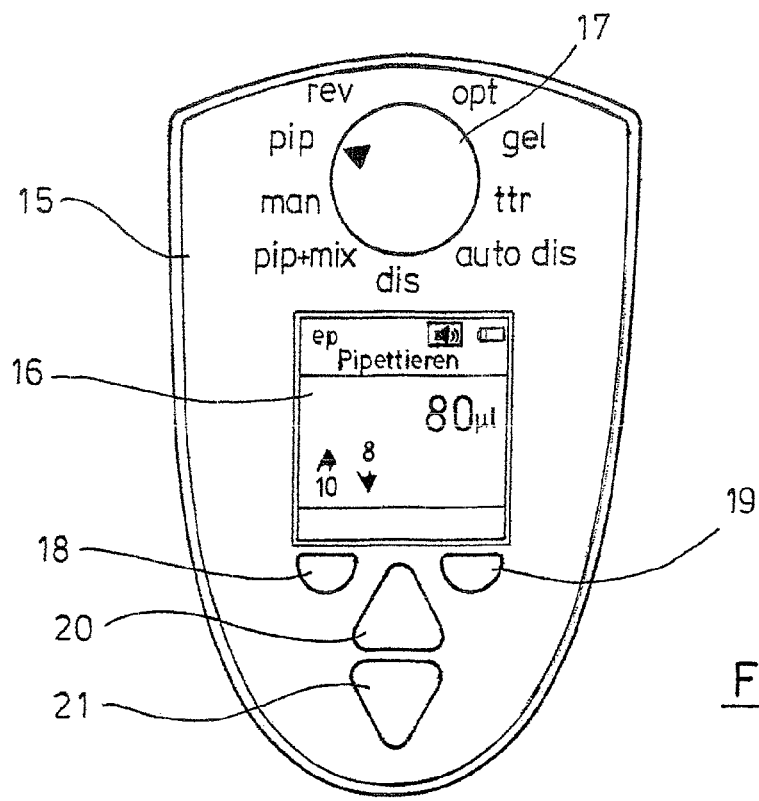
FIG.4.8

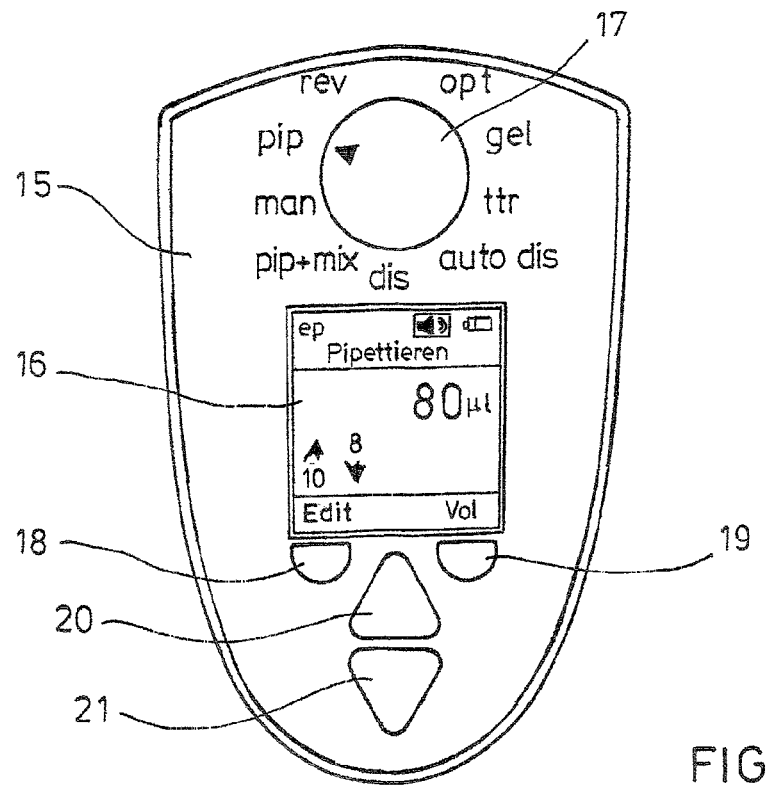
FIG.4.9
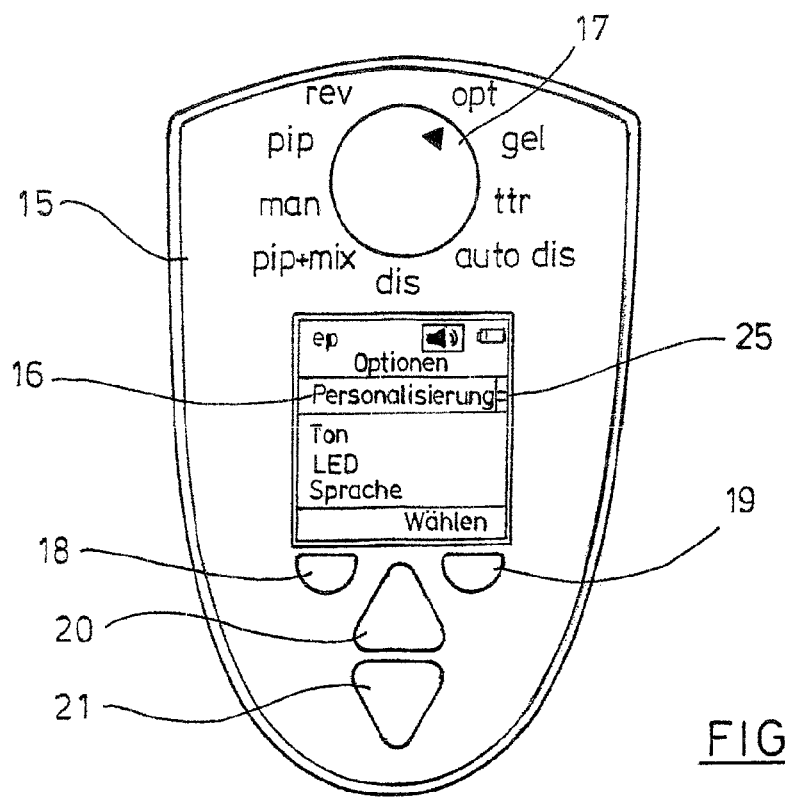
FIG.4.10

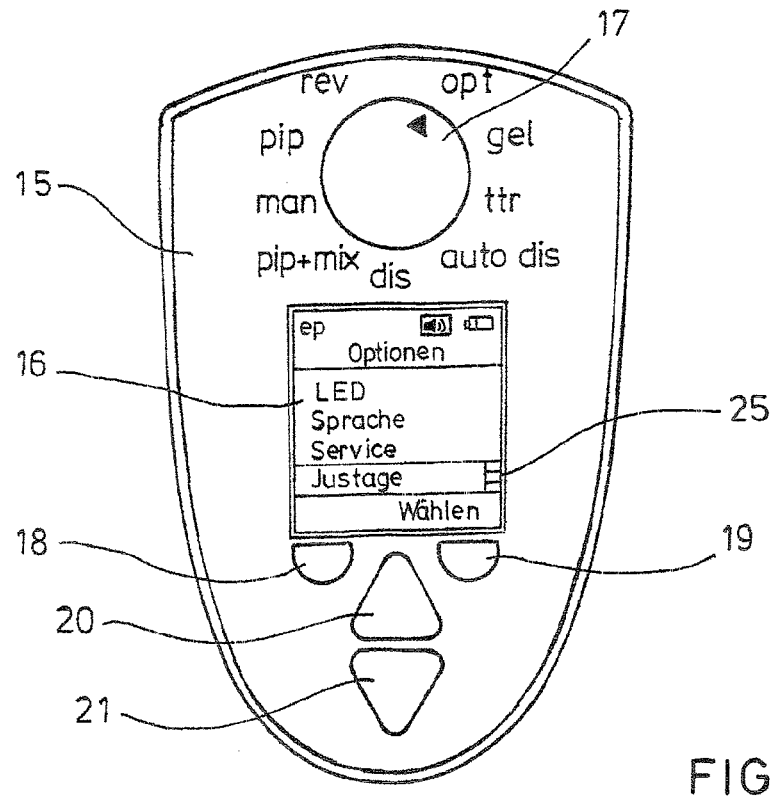
FIG. 4.11
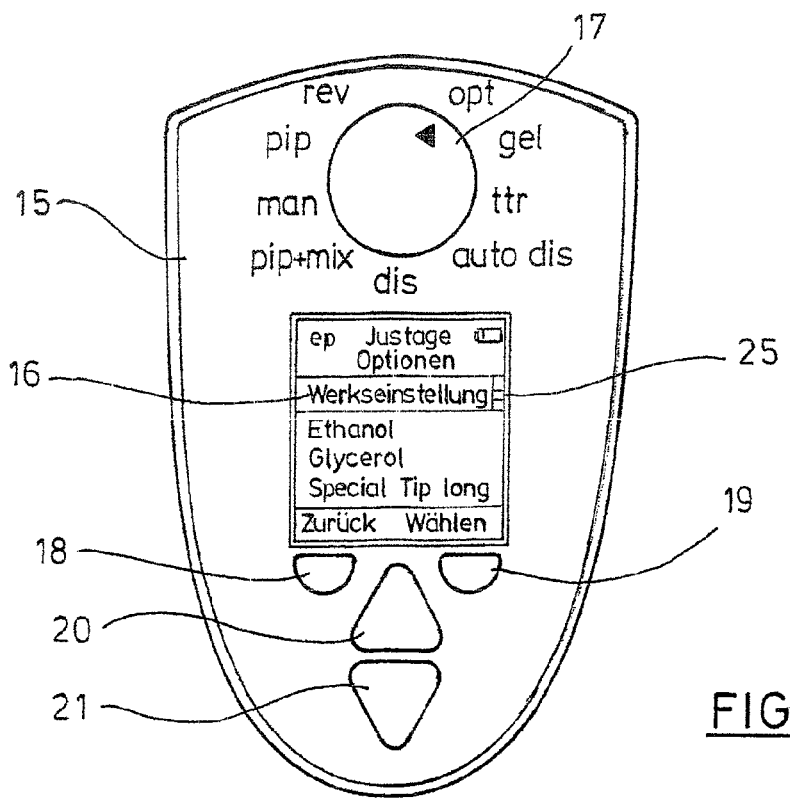
FIG. 4.12

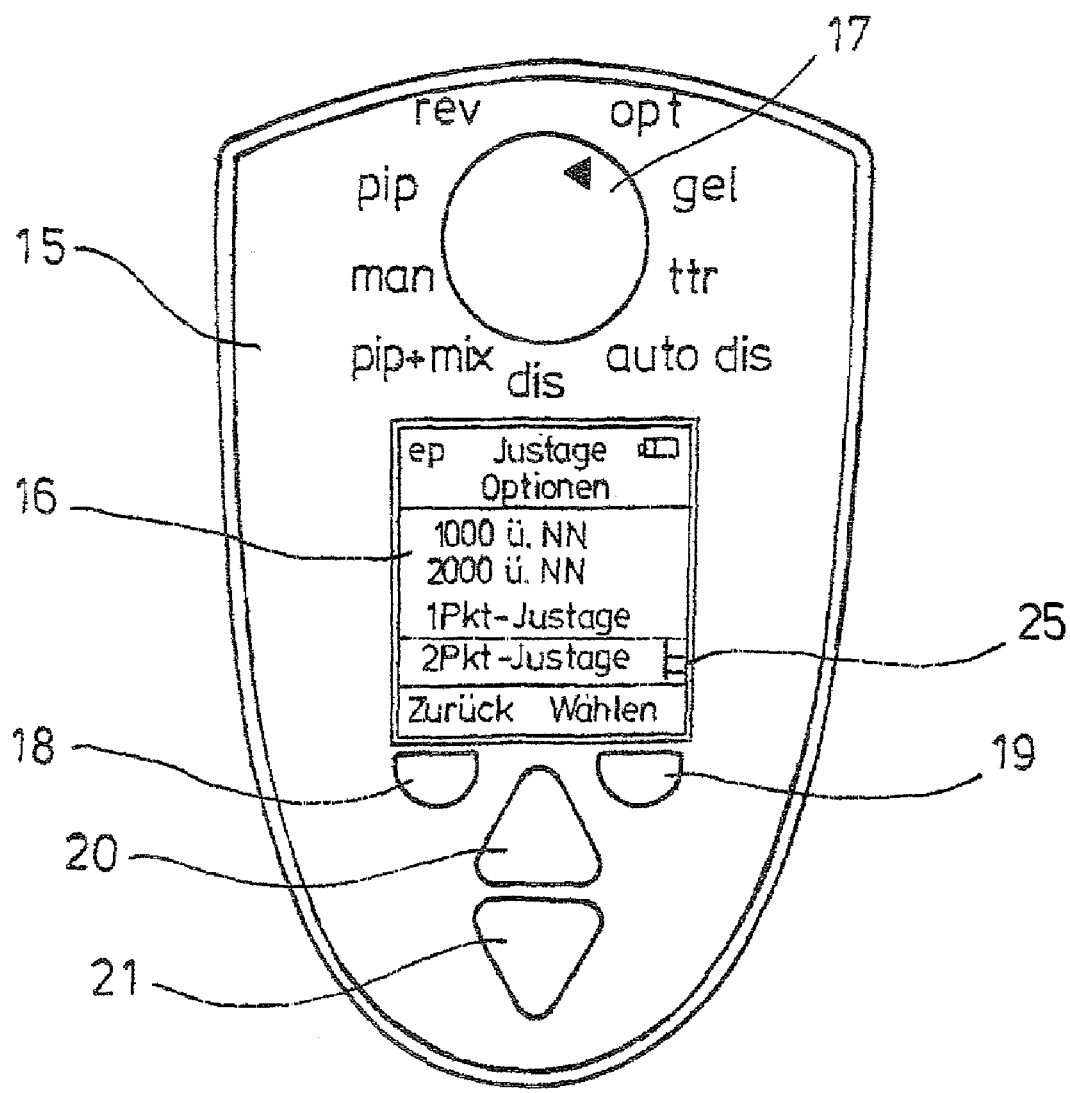
FIG. 4.13

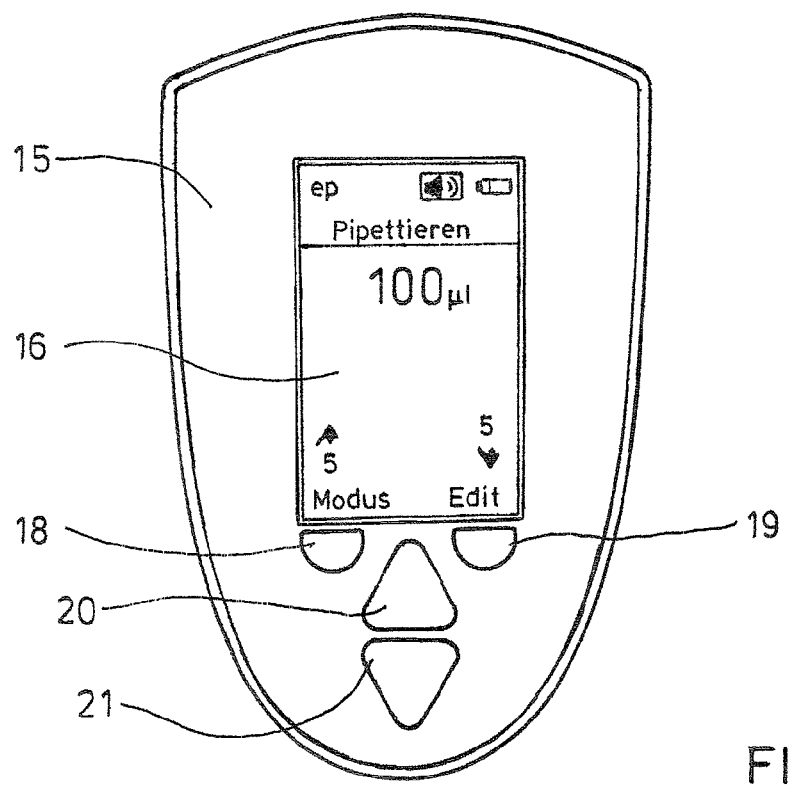
FIG.5.1
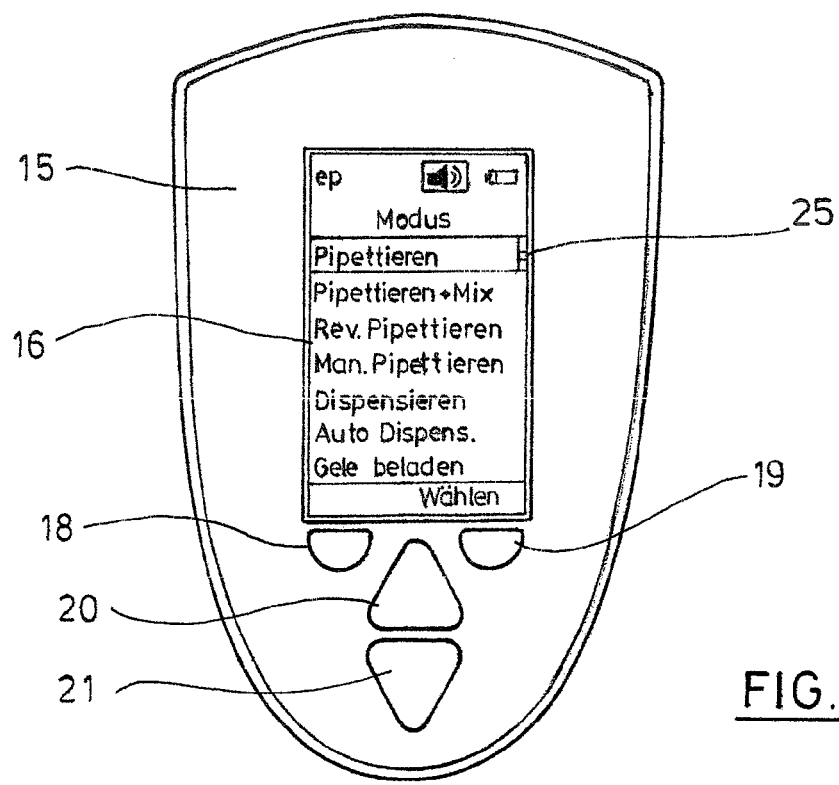
FIG.5.2

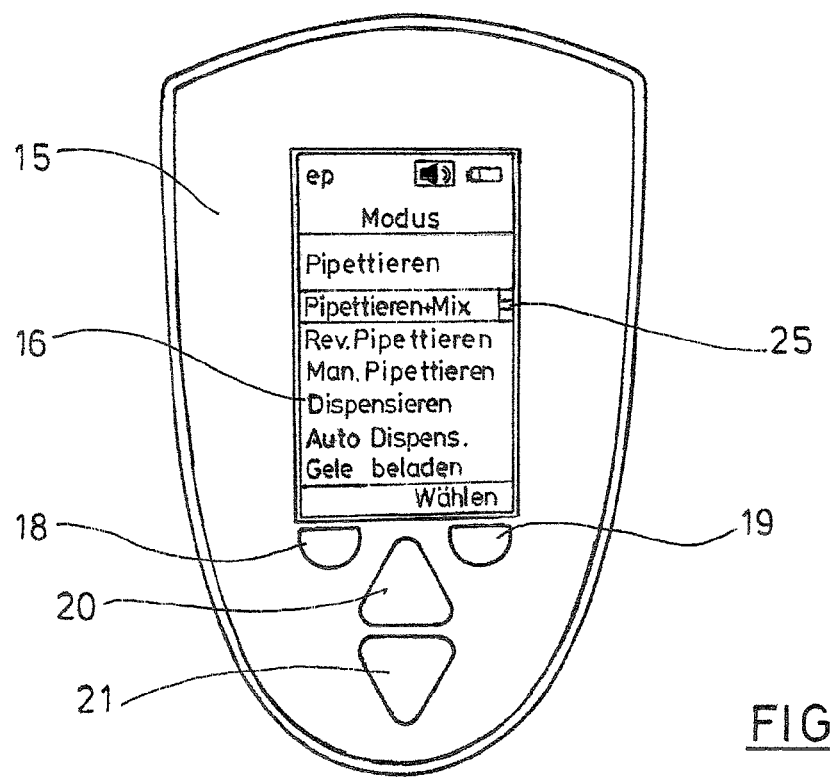
FIG.5.3
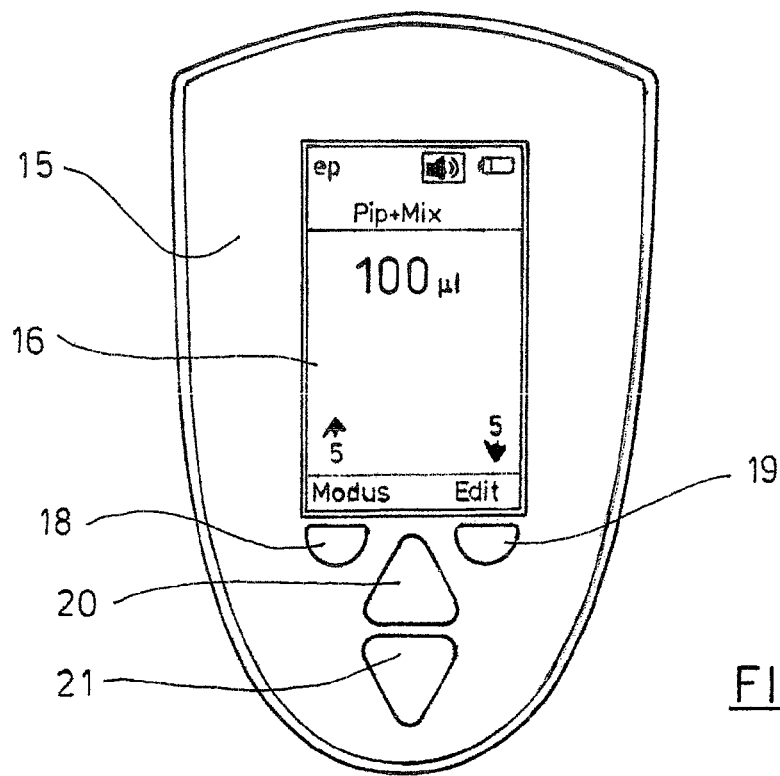
FIG.5.4

ELECTRONIC METERING APPARATUS FOR METERING LIQUIDS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an electronic metering apparatus for metering liquids.

Known electronic metering apparatuses for metering liquids have a drive with an electric motor and an electronic display device, respectively, and a displacer device driven by the motor, which comprises a cylinder with a plunger arranged movable therein. The displacer device can be communicatingly connected to a replaceable pipette point. By means of the displacer device, an air cushion is dislocated, which aspirates liquid into the pipette point and ejects it from the same, respectively. Pipette points and syringes are preferably disposable objects for single use, made from a plastic material. The stroke volume of the plunger does not exactly correspond to the picked-up and delivered liquid volume. This is particularly due to the fact that the air column becomes somewhat longer through the weight of the liquid, so that the stroke volume exceeds the liquid volume.

From WO 2005/079988 A1, the entire contents of which is incorporated herein by reference, a pipette with an electronic display and a calibration function is known. The calibration function includes the input of an actually pipetted volume at a certain displayed volume into the control system of the pipette via a user interface. The control system calculates calibration data and memorizes them in a memory. By means of the calibration data, the stroke length of the plunger or the volume displayed by the display device is corrected, so that the displayed volume corresponds better to the actually metered volume. It is possible to memorize different calibration data in the control system, which are used for different pipetting functions (also called "modes of operation"), like direct pipetting or reverse pipetting. Direct pipetting includes the direct pick-up of the desired volume to be delivered, whereas reverse pipetting includes the pick-up of a volume which is greater than the desired volume to be delivered, which is delivered thereafter.

In the known pipette, a new calibration may become necessary, when one of the provided modes of operation is not selected but other conditions of operation are changed instead.

Departing from this, the present invention is based on the objective to provide an electronic metering apparatus, the use of which under different modes of operation is less impaired by calibrations.

BRIEF SUMMARY OF THE INVENTION

The electronic metering apparatus for metering liquids has a drive, at least one displacer device with a displacer chamber and a displacer element arranged therein, which is connected to the drive, at least one holding device for a pipette point, which has a passage channel which is connected with the displacer chamber, a data memory with memory locations for different calibration data concerning different pipette points and/or different liquids and/or different usage conditions, an electric selection device for selecting calibration data, an electric control unit, which is connected to the electric selection device, the data memory, and an electric drive motor of the drive and/or an electric display device, and which controls the movement of the displacer element by means of the electric motor and/or the display of the metering volume through the display device with recourse to the calibration data from the data memory, selected with the aid of the selection device, and an electric power supply.

The metering apparatus according to the present invention permits a simple calibration, by selection of memorized calibration data concerning different pipette points and/or different liquids and/or different conditions of application. Through this, it is possible to continue working under different conditions of operation, immediately after selection of the calibration data corresponding to the new conditions of operation, which result from a replacement of the pipette point (for instance, with another geometry from another material or with another surface, respectively), or from metering another liquid (for instance with another density or viscosity, respectively) or from a change of the conditions of application (for instance, different environmental conditions, like temperature, air pressure, air humidity, or different pipetting techniques like dipping in the pipette point into the liquid to different depths or different alignment or movement of the pipette). It is not necessary to perform a calibration of the metering apparatus under the new conditions of operation immediately before. In this, the selection can be restricted to one kind of the mentioned calibration data or it may comprise several different kinds or all the kinds of the calibration data.

According to a first alternative, making recourse to the selected calibration data from the data memory, the control unit controls the drive motor such that the displacer element aspirates exactly as much liquid as is desired into the pipette point or ejects it from the same, respectively. According to a second alternative, at a given movement of the displacer element, making recourse to the calibration data, the control unit controls the display such that the display exactly corresponds to the liquid volume which was picked up or ejected, respectively. The second alternative may be either a metering apparatus with a drive with an electric drive motor, or a metering apparatus with a manually driven drive. In a manually driven electronic metering apparatus, the drive has an actuation element, which can be manually dislocated between two stops and accordingly dislocates the displacer element. In this, at least one stop for setting the metering volume or for a manufacturer's calibration, respectively, may be dislocatable.

The present invention is related to stationary working metering apparatuses as well as to manual metering apparatuses, also called "handheld metering apparatuses".

According to one embodiment, the calibration data are calibration data for pipette points of different geometry (e.g. conical, cylindrical or with conical and cylindrical portions) and/or from different materials (e.g., PE, PP or PS) and/or with different surfaces (roughnesses, for instances) and/or calibration data for different liquids (for instance, ethanol, propanol) and/or for different types of liquids (e.g. glycerol-, protein solutions) and/or calibration data for at least one environmental condition (for instance, temperature, air pressure, air humidity) and/or calibration data for at least one application (for instance, not wetted pipette point or pipette point which is pre-wetted before metering) and/or calibration data for at least one user (for instance depth of dipping into sample liquid, alignment of the pipette with respect to the vertical, movement of the pipette point).

According to one embodiment, the data memory comprises a non-volatile data memory (an EEPROM, for instance), so that calibration data are not lost when switching off the power supply. According to a further embodiment, the calibration data comprises permanently memorized calibration data. In this, it is dealt with calibration data which must not be erased or overwritten, respectively. The latter are calibration data, for instance, onto which must be recurred frequently or which do not change during the life span of the metering apparatus (for certain pipette points, certain liquids or frequent usage conditions like normal temperature and normal pressure, for instance). Accordingly, the data memory is for instance a permanent memory, (a ROM, for instance) or at least partly write-protected.

The calibration data can be introduced into the data memory before using the metering apparatus, so that when using, only a selection of the relevant calibration data has to be performed, in principle. As the case may be, the calibration data can be updated or supplemented later, respectively. The calibration data can be written into the data memory in different ways. For instance, it is possible to acquire the calibration data by suitable methods and to write them into the data memory via an electric input device, which is connected to the electric control unit. For instance, the calibration data can be acquired by gravimetric measurements and analysis of the measurements, which as the case may be the user performs using an external data processing equipment with a suitable software, for instance. Also, it is possible to calculate further calibration data departing from existing calibration data, which apply for a changed geometry of the pipette points and/or liquids with another density and/or another temperature and/or another air pressure and/or another dip-in depth of the pipette point and/or another alignment of the pipette with respect to the vertical. In particular, the calculation bases can be taken from the mathematical model described in EP 0 562 358 B2 in paragraphs [0019] to [0034], the entire contents of which is incorporated herein by reference. The user can also perform these calculations, as the case may be, using an external data processing equipment with a suitable software. Further, it is possible to perform this calculation of the calibration data by means of the control unit, wherein the data concerning different pipette points and/or different liquids and/or different application conditions are input into the electronic metering apparatus via an electric input device.

One embodiment has an electric input device for putting in at least one gravimetrically acquired volume and/or at least one density of a liquid and at least one gravimetrically acquired mass of the liquid, wherein the control unit calculates calibration data from the gravimetrically acquired volume and/or calculates a gravimetric volume and calibration data therefrom from the density and the gravimetrically determined mass, and writes the calibration data into the data memory. In this embodiment, the results of the gravimetric measurement are input into the metering apparatus in which the calibration data are calculated. There is no awesome calculation of the calibration data by the user. The results of the gravimetric measurement are transformed into calibration data by the metering apparatus and the same are stored in the data memory. In the variant which permits the input of the mass and the density of the liquid, the step of the volume calculation by the user is also avoided.

According to a further embodiment, plural gravimetric measurement values can be put in by means of the input device, from which the control unit determines the calibration data for a multipoint calibration, which it writes into the data memory. A multipoint calibration permits a particularly accurate measurement across a large range of settable metering volumes.

The electric selection device for selecting calibration data is integrated into a docking station for instance, which accommodates the electronic metering apparatus in usage breaks. The docking station may contain a charger for charging accumulators of the electric power supply of the metering apparatus. It determines the environmental conditions (temperature, air pressure, air humidity) and forwards these data via contacts or in a wireless manner to the electric control unit, which makes recourse to the corresponding calibration data in the operation of the metering apparatus, wherein the latter can be arranged in the docking station or can be taken out of it. According to another embodiment, the selection device is integrated into the metering apparatus such that upon use of the metering apparatus, it detects automatically the respective used pipette points and/or the application conditions at a time, and supplies corresponding data to the control unit, which on its turn makes recourse to the corresponding calibration data. For instance, the pipette point used can be detected by a code attached thereon which is read by a reading device of the metering apparatus when the pipette point is put into the metering apparatus. The liquid used can be acquired by a reading device of the metering apparatus by reading a tag (like a barcode, for instance) of a storage bottle, for instance. Application conditions like temperature, air pressure, air humidity, dip-in depth of the pipette point and alignment of the metering apparatus with respect to the vertical can be detected by means of suitable sensors of the metering apparatus.

According to one embodiment, the electric metering apparatus comprises an electric input device for putting in and/or selecting calibration data concerning different pipette points and/or different liquids and/or different application conditions. On account of the input or selected data, respectively, the control unit makes recourse to the assigned calibration data. According to one embodiment, the input device is an electric keyboard.

According to a further embodiment, the electric input device has at least two keys (called "mode key" and "parameter key"), the actuation of which triggers that the control unit controls the display of different menus by the display device or the entry of displayed inputs.

According to a further embodiment, the input device has a pair of electric control keys arranged next to each other, and the electric control unit controls the display of menu items by the display device, as well as the change of parameters and the display thereof by the display device, corresponding to the actuation of the control keys. According to a further embodiment, the electric control unit controls the dislocation of the displacer element by the electric motor, corresponding to the actuation of the control keys.

The above embodiments of the input device facilitate the operation of the metering apparatus. In particular, they permit a simple selection of calibration data and a simple input of results of gravimetric measurements.

According to one embodiment, the input device permits the setting of different modes of operation (like pipetting, dispensing or titrating, for instance) and/or the setting of metering parameters (like metering amount, dispensing steps, plunger speed when aspirating and ejecting liquid, for instance) and/or the control of the movement of the displacer element.

According to one embodiment, the input device has a turnable setting button for setting the mode of operation of the metering apparatus.

According to one embodiment, the electric control unit comprises a microprocessor or a microcontroller.

The electric power supply supplies the electric components of the metering apparatus with electric current. According to a further embodiment, the electric power supply comprises a mains power pack and/or at least one battery and/or at least one accumulator and/or an electric charger for charging the accumulator.

BRIEF DESCRIPTION OF THE SEVERAL VIEWS OF THE DRAWINGS

In the following, the present invention will be explained in more detail by means of the attached drawings of examples of its realization. In the drawings show:

FIG. 1 an electronic metering apparatus in a perspective X-ray image, skew from the front and from the side;

FIG. 2 the same metering apparatus in a view from the side;

FIG. 4 the front side of the housing head of the metering apparatus in different operating situations in a schematic top view;

FIG. 5 the front side of the housing head of a metering apparatus without setting button in different operating situations in a schematic top view.

DETAILED DESCRIPTION OF THE INVENTION

Figure 3:
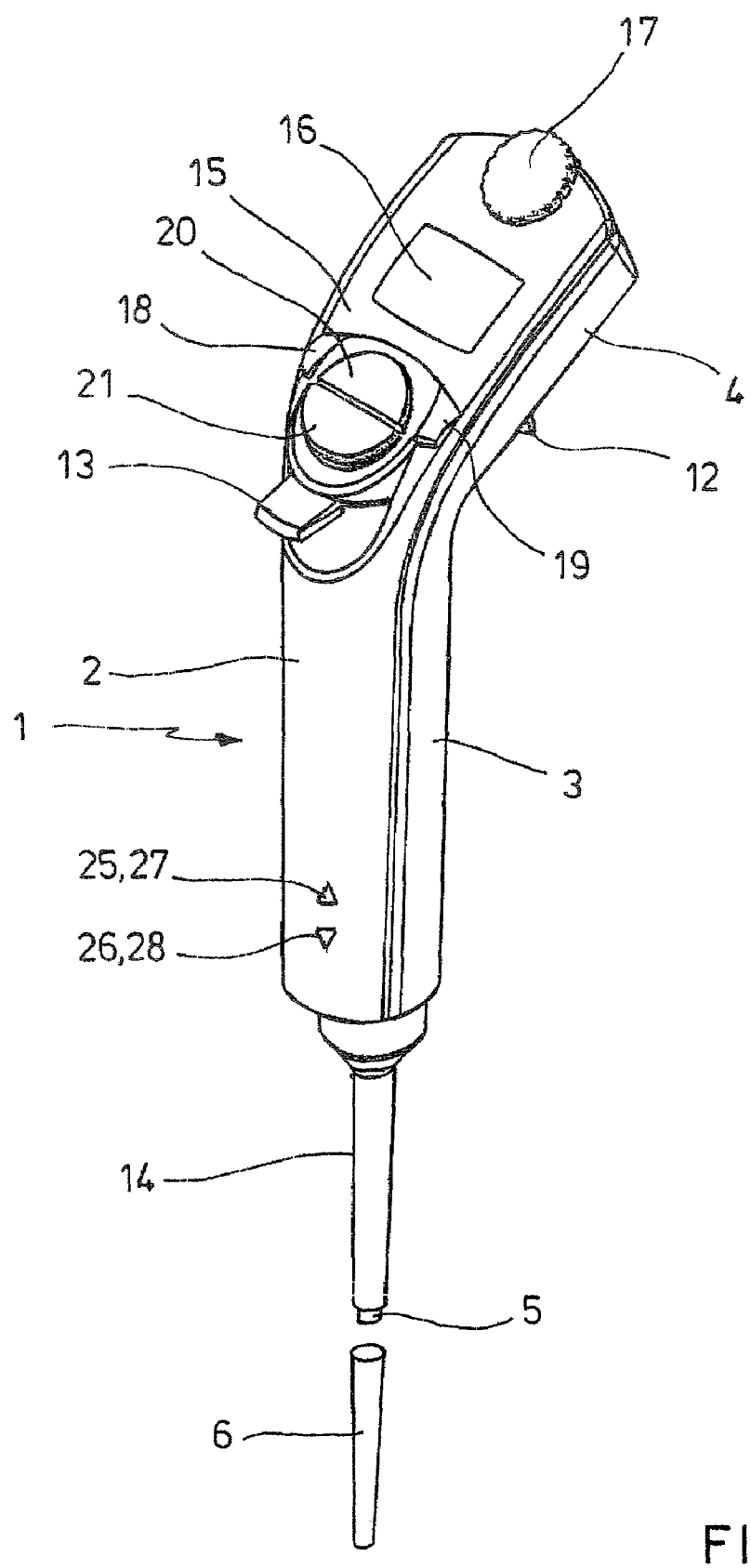
FIG. 3 the same metering apparatus in the same perspective view as in FIG. 1, but without representation of components situated in the interior.

While this invention may be embodied in many different forms, there are described in detail herein a specific preferred embodiment of the invention. This description is an exemplification of the principles of the invention and is not intended to limit the invention to the particular embodiment illustrated According to FIG. 1 to 3, a metering apparatus 1 has a housing 2 realized as a handle, with a longitudinal housing shaft 3 and a housing head 4 angled at about 45° on the upper end. The housing 2 has a cone 5 at the lower end for putting up a pipette point 6.

In the housing shaft 3, a drive 7 with an electric motor 8 is arranged. Further, there is a cylinder 9 with a longitudinally movable plunger 10 arranged therein, which is mechanically connected with the drive 7. Via a connecting channel 11, the cylinder 9 is connected to an opening at the end of the cone 5.

On its lower side, the housing head 4 has a downward bent hook 12, which facilitates securely holding the metering apparatus 1 on the housing shaft 3. At the upper end of the housing shaft 3, a discarder key 13 is arranged, which is mechanically connected with a discarder sleeve 14, so that by actuation of the discarder key 13, a pipette point 6 can be pushed off from the cone 5.

On the topside or front side, respectively, of the housing head 4 there is a display device 16 or a display, respectively, which is realized as a LCD display. Above the display device 16, there is a turnable setting button 17 for rapidly setting the modes of operation.

Below the display device 16, a mode key 18 and a parameter key are arranged laterally off-set to each other. Between them, there are two control keys 20, 21 on top of each other, wherein the upper control key 20 controls an upward movement and the lower control key 21 controls a downward movement and an overblow stroke.

The control key 20 has only one single switching point. The control key 21 has two switching points, wherein reaching the first switching point triggers the downward movement and reaching the second switching point triggers an overblow stroke of the plunger 10.

In the housing head 4, an electric control unit 22 is arranged on a circuit board, which is connected with the electric motor 8, the display device 16, the setting button 17 and the keys 18 to 21. Preferably, the electric control unit 22 comprises an electronic data processing unit, a microcomputer or a microcontroller for instance.

Further, there is a data memory 23, which is at least one separate component part or is integrated into the microcontroller.

Further, an electric power supply 24 is present in the housing head 4, which is formed by several accumulators for instance, which can be charged by means of an external charger. The electric power supply 24 supplies the electric component parts of the metering apparatus 1 with electric current.

From a standby mode, into which it falls after a certain idle period, the electronic metering apparatus 1 can be brought into the normal operating condition by actuating an arbitrary key 18 to 21. In addition or instead of this, a not shown on/off-switch can be present for switching on the normal operating condition or switching it off, respectively.

After switching on, the display device shows a submenu with the lastly set mode of operation and the lastly set metering parameters of this mode of operation.

In FIG. 4.1, this is shown for the case that the mode of operation pipetting ("pip") is set by means of the setting button 17.

After actuation of the mode key 18, it is possible to change metering parameters of this mode of operation. In FIG. 4.2, the display device 16 after actuation of the mode key 18 is shown. The changeable metering parameter (the metering volume 100 µl here) is graphically accentuated (by color, for instance), through a lighter grey tone here.

Thereafter, through actuation of the control keys 20, 21, the value of the metering parameter can be increased or decreased, respectively. In FIG. 4.3 this is shown for a reduction of the metering volume (to 80 µl).

Through actuation of the parameter key 19, the set metering parameter is transferred and is switched over to another changeable metering parameter, which the display device 16 indicates by graphic accentuation (FIG. 4.4). Here, this is the plunger speed when ejecting liquid (5 mm/s). This metering parameter can then be changed with the aid of the control keys 20, 21, to 8 mm/s in the example (FIG. 4.5). Thereafter, the change can be transferred by newly actuating the parameter key 19 and can be switched over to the plunger speed when aspirating, which is indicated by graphical accentuation (FIG. 4.6). This metering parameter can be changed by means of the control keys 20, 21, here to 10 mm/s (FIG. 4.7).

Through actuation of the mode key 18, it is possible to transfer the last change and to switch back from the editing mode to the pipetting mode. Thereafter, by actuation of the control key 20, a volume of 80 µl of liquid can be picked up into the pipette point (FIG. 4.8) and be delivered by actuation of the control key 21 (FIG. 4.9).

By turning the setting button 17, other modes of operation are reached, for instance manual pipetting ("man"), pipetting and mixing ("pip und mix") dispensing ("dis"), automatic dispensing ("auto dis"), titrating ("ttr"), gel loading ("gel") and reverse pipetting ("rev").

By setting the setting button 17 to the position options ("opt"), a submenu is invoked on the display device 16 (FIG. 4.10), from which by actuation of the control keys 20, 21 different menu items can be steered for, to which a pointer 25 points (FIG. 4.11). Through actuation of the parameter key 19, one single menu item can be selected.

When the menu item "Justage" (adjustment) is selected, a submenu appears which is concerned with the selection or the input, respectively, of different calibration parameters (FIG. 4.12). Through actuation of the control keys 20, 21 certain menu items can be steered for and can be selected by actuation of the parameter key 19 (FIG. 4.13). Thus, for instance the calibration parameters of the manufacturer's setup, for ethanol or glycerol or for a particularly long pipette point ("Special Tip long") can be selected (FIG. 4.12). It is also possible to select the calibration parameters for certain geographical altitudes at which the pipette is used (FIG. 4.13).

Furthermore, after selecting the corresponding menu items, the gravimetric values for endpoint, two-point or three-point adjustment can be put in (FIG. 4.13).

By turning the setting button 17, the user reaches the menu in which the selected mode of operation with the actual parameters is indicated (for instance, FIG. 4.9).

Thereafter, he/she can meter in the selected mode of operation, wherein the control unit makes recourse to the selected calibration data, which are memorized in the data memory 23. As the case may be, the metering parameters effective in the mode of operation can be changed in the manner described above.

FIG. 5 shows the top side 15 of the housing head 4 of a further metering apparatus, which has no setting wheel 17. The modes of operation of this metering apparatus are selected via the menu indicated by the display device 16 and the keys 18 to 21.

For this purpose, the mode key 18 is pushed, departing from the automatically appearing display for the lastly selected mode of operation with the lastly set metering parameters (5.1), after which a menu with the selectable modes of operation is displayed (FIG. 5.2). By means of the control keys 20, 21, the pointer 25 is set to a desired mode of operation (FIG. 5.3). In order to confirm the mode of operation, the parameter key 19 is pushed, after which the selected mode of operation with the lastly set metering parameters is displayed (FIG. 5.4).

For the rest, the operation takes place as with the above-described embodiment of FIG. 1 to 4, with a setting wheel for setting the mode of operation. In particular, the metering parameters, the execution of metering processes in selected modes of operation, the selection of calibration data as well as the input of the results of gravimetric measurements takes place as in the example of realization described above.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An electronic metering apparatus for metering liquids with a drive (7, 8), at least one displacer device (9, 10) with a displacer chamber (9) and a displacer element (10) arranged therein, which is connected to the drive (7,8), at least one holding device (5) for a pipette point (6), which has a passage channel (11) which is connected with the displacer chamber (9), a data memory (23) with memory locations for different calibration data concerning different types of calibration parameters which are selected from the group comprising different pipette points, different liquids and different usage conditions, an electric selection device (18, 19, 20, 21) for selecting the calibration parameter, an electric control unit (22), which is connected to the electric selection device (18, 19, 20, 21), the data memory (23), and to the electric drive motor (8) of the drive (7, 8) and to an electric display device (16), and which controls the movement of the displacer element (10) by means of the electric motor (8) and the display of the metering volume through the display device (16) making recourse to the calibration data from the data memory (23), selected with the aid of the selection device (18, 19, 20, 21), and an electric power supply (24), characterized in that the memorized calibration data concerning different types of calibration parameters are displayable on the display device (16) by means of the selection device (18, 19, 20, 21) and wherein at least one calibration parameter may be selected for performing at least one metering with the selected calibration parameter.

2. A metering apparatus according to claim 1, which is a handheld metering apparatus.

3. A metering apparatus according to claim 1, wherein the calibration data comprise calibration parameters which are selected from the group comprising pipette points (6) of different geometry and from different materials and with different surfaces and different liquids and different types of liquids and at least one environmental condition and at least one application and at least one user.

4. A metering apparatus according to claim 1, wherein the data memory (23) comprises a non-volatile data memory.

5. A metering apparatus according to claim 1, wherein the data memory (23) comprises permanently memorized calibration data.

6. A metering apparatus according to claim 1, which has an electric input device (18, 19, 20, 21) for putting in at least one gravimetrically determined volume or at least one density of a liquid and at least one gravimetrically determined mass of the liquid, wherein the control unit (22) calculates calibration data from the gravimetrically determined volume or calculates a gravimetric volume and calibration data therefrom from the density and the gravimetrically determined mass, and writes the calibration data into the data memory (23).

7. A metering apparatus according to claim 6, wherein plural gravimetric measurement values can be input by means of the input device (18, 19, 20, 21), from which the control unit (22) determines the calibration data for a multipoint calibration, which it writes into the data memory (23).

8. A metering apparatus according to claim 1, wherein the electric selection device (18, 19, 20, 21) comprises an electric input device for putting in and selecting calibration data concerning different pipette points (6) and different liquids and different application conditions.

9. A metering apparatus according to claim 6, wherein the electric input device (18, 19, 20, 21) comprises at least one mode key (18) and a parameter key (19), the actuation of which triggers that the control unit (22) controls the display of different menus by the display device (16) or the entry of displayed inputs.

10. A metering apparatus according to claim 6, wherein the input device (18, 19, 20, 21) has a pair of electric control keys (20, 21) disposed next to each other, and the electric control unit (22) controls the display of menu items by the display device (16) as well as the change of parameters and the display thereof by the display device (16), corresponding to the actuation of the control keys (20, 21).

11. A metering apparatus according to claim 10, wherein the electric control unit (22) controls the dislocation of the displacer element (10) by the electric motor (8), corresponding to the actuation of the control keys (20, 21).

12. A metering apparatus according to claim 6, wherein the input device (18, 19, 20, 21) permits the setting of different modes of operation or the setting of metering parameters or the control of the movement of the displacer element (10).

13. A metering apparatus according to claim 6, wherein the input device comprises a turnable setting button (17) for setting the mode of operation of the metering apparatus.

14. A metering apparatus according to claim 1, wherein the electric control unit (22) comprises a microprocessor or a microcontroller.

15. The electronic metering apparatus of claim 1 wherein the calibration parameter is different pipette points.

16. The electronic metering apparatus of claim 15 wherein an additional calibration parameter is different liquids.

17. The electronic metering apparatus of claim 16 wherein an additional calibration parameter is different usage conditions.

* * * * *